(12) United States Patent
Hsieh et al.

(10) Patent No.: US 9,639,161 B2
(45) Date of Patent: May 2, 2017

(54) GESTURE RECOGNITION MODULE AND GESTURE RECOGNITION METHOD

(71) Applicant: Wistron Corporation, New Taipei (TW)

(72) Inventors: Sheng-Hsien Hsieh, New Taipei (TW); Shou-Te Wei, New Taipei (TW); Pin-Hong Liou, New Taipei (TW); Che-You Kuo, New Taipei (TW)

(73) Assignee: Wistron Corporation, New Taipei (TW)

( * ) Notice: Subject to any disclaimer, the term of this patent is extended or adjusted under 35 U.S.C. 154(b) by 207 days.

(21) Appl. No.: 14/020,898

(22) Filed: Sep. 9, 2013

(65) Prior Publication Data
US 2014/0139423 A1 May 22, 2014

(30) Foreign Application Priority Data

Nov. 21, 2012 (TW) .............................. 101143511 A

(51) Int. Cl.
*G09G 5/00* (2006.01)
*G06F 3/033* (2013.01)
(Continued)

(52) U.S. Cl.
CPC ............ *G06F 3/017* (2013.01); *G06F 3/0304* (2013.01)

(58) Field of Classification Search
CPC ...... G06F 3/017; G06F 3/0304; G06F 3/0325; G06K 9/00355; G06K 2009/3225
See application file for complete search history.

(56) References Cited

U.S. PATENT DOCUMENTS

2009/0228841 A1* 9/2009 Hildreth ................. 715/863
2009/0284469 A1 11/2009 Hsieh
(Continued)

FOREIGN PATENT DOCUMENTS

CN 101501614 A 8/2009
CN 101907923 A 12/2010
(Continued)

OTHER PUBLICATIONS

Office action mailed on Nov. 27, 2014 for the Taiwan application No. 101143511, filed: Nov. 21, 2012, p. 1 line 1~14 and p. 2~14.

*Primary Examiner* — Alexander Eisen
*Assistant Examiner* — Nan-Ying Yang
(74) *Attorney, Agent, or Firm* — Winston Hsu; Scott Margo

(57) ABSTRACT

A gesture recognition module for recognizing a gesture of a user is disclosed. The gesture recognition module comprises an image capturing unit, for capturing a first pixel value, a second pixel value, a third pixel value and a fourth pixel value sequentially of images of the gesture of the user; a computing unit, coupled to the image capturing unit, for determining a first minimum surrounding shape comprising a first pixel difference between the first pixel value and the second pixel value, and determining a second minimum surrounding shape comprising a second pixel difference between the third pixel value and the fourth pixel value; and a determining unit, coupled to the computing unit, for determining the gesture according to a relation between the first minimum surrounding shape and the second minimum surrounding shape.

22 Claims, 6 Drawing Sheets

(51) Int. Cl.
  *G09G 5/08* (2006.01)
  *G06F 3/042* (2006.01)
  *G06F 3/01* (2006.01)
  *G06F 3/03* (2006.01)

(56) References Cited

U.S. PATENT DOCUMENTS

2009/0315740 A1* 12/2009 Hildreth ............... G06F 3/017
　　　　　　　　　　　　　　　　　　　341/20
2010/0277438 A1* 11/2010 Kawashima ........... B60K 35/00
　　　　　　　　　　　　　　　　　　　345/175
2011/0026765 A1* 2/2011 Ivanich et al. ................ 382/103
2011/0102570 A1 5/2011 Wilf
2013/0120250 A1* 5/2013 Lin ....................... G06F 3/011
　　　　　　　　　　　　　　　　　　　345/157

FOREIGN PATENT DOCUMENTS

| TW | 200945174 | 11/2009 |
| TW | 200949617 | 12/2009 |
| TW | 201019241 | 5/2010 |
| WO | 2008018943 A1 | 2/2008 |

* cited by examiner

GESTURE RECOGNITION MODULE AND GESTURE RECOGNITION METHOD

BACKGROUND OF THE INVENTION

1. Field of the Invention

The present invention relates to a gesture recognition module and a gesture recognition method, and more particularly, to a gesture recognition module and a gesture recognition method with a low complexity and a high accuracy.

2. Description of the Prior Art

With the progress and spread of a high-speed network, a user can watch digital contents and multimedia information via a computer or a set-top box. In general, the user is needed to input a command to the computer or the set-top box via an input device such as a keyboard, a mouse, etc., to control the computer or the set-top box, e.g., select or display the digital contents and the multimedia information. That is, it is difficult to control the computer or the set-top box, if the user does not (or is not inconvenient to) use the abovementioned input devices. Thus, convenience of the computer or the set-top box is limited.

On the other hand, as technology of image recognition becomes more and more mature, gaming devices with the image recognition are provided by video game manufacturers, peripheral devices with the image recognition are provided by computer manufacturers and liquid crystal display (LCD) televisions (TVs) with the image recognition are provided by appliance manufacturers. Thus, the user can control a gaming device, a peripheral device or a LCD TV via the image recognition. Among various types of the image recognition, one of widely used image recognition is gesture recognition. When controlling an abovementioned device via the gesture recognition, the user needs to make a predetermined gesture in front of a detector (e.g., camera) coupled to the device. Then, the device can determine (i.e., recognize) a command inputted by the user, and execute an operation corresponding to the command.

However, accuracy of the gesture recognition is easily affected by the user and/or environment, such as resolution of image, integrity of gesture, sufficiency of light source and/or complexity of background. Thus, it may be difficult for the device to capture the image which is clear enough. As a result, a wrong decision may be made, and a wrong command or no command may be executed. Although an image recognition algorithm with a higher complexity or the detector with a higher cost can be used to improve the accuracy of the gesture recognition, manufacturing cost increases accordingly and sales of the products may be degraded. Thus, improving the accuracy of the gesture recognition with a lower cost is a topic to be discussed and addressed.

SUMMARY OF THE INVENTION

The present invention therefore provides a gesture recognition module and a gesture recognition method to solve the abovementioned problem.

A gesture recognition module for recognizing a gesture of a user is disclosed. The gesture recognition module comprises an image capturing unit, for capturing a first pixel value, a second pixel value, a third pixel value and a fourth pixel value sequentially of images of a first gesture of the user; a computing unit, coupled to the image capturing unit, for determining a first minimum surrounding shape comprising a first pixel difference between the first pixel value and the second pixel value, and determining a second minimum surrounding shape comprising a second pixel difference between the third pixel value and the fourth pixel value, wherein shapes of the first minimum surrounding shape and the second minimum surrounding shape are the same or methods for generating the first minimum surrounding shape and the second minimum surrounding shape are the same; and a determining unit, coupled to the computing unit, for determining the first gesture according to a relation between the first minimum surrounding shape and the second minimum surrounding shape.

A method of recognizing a gesture of a user is disclosed. The method is utilized in a gesture recognition module and comprises capturing a first pixel value, a second pixel value, a third pixel value and a fourth pixel value sequentially of images of a first gesture of the user; determining a first minimum surrounding shape comprising a first pixel difference between the first pixel value and the second pixel value, and determining a second minimum surrounding shape comprising a second pixel difference between the third pixel value and the fourth pixel value, wherein shapes of the first minimum surrounding shape and the second minimum surrounding shape are the same or methods for generating the first minimum surrounding shape and the second minimum surrounding shape are the same; and determining the first gesture according to a relation between the first minimum surrounding shape and the second minimum surrounding shape.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
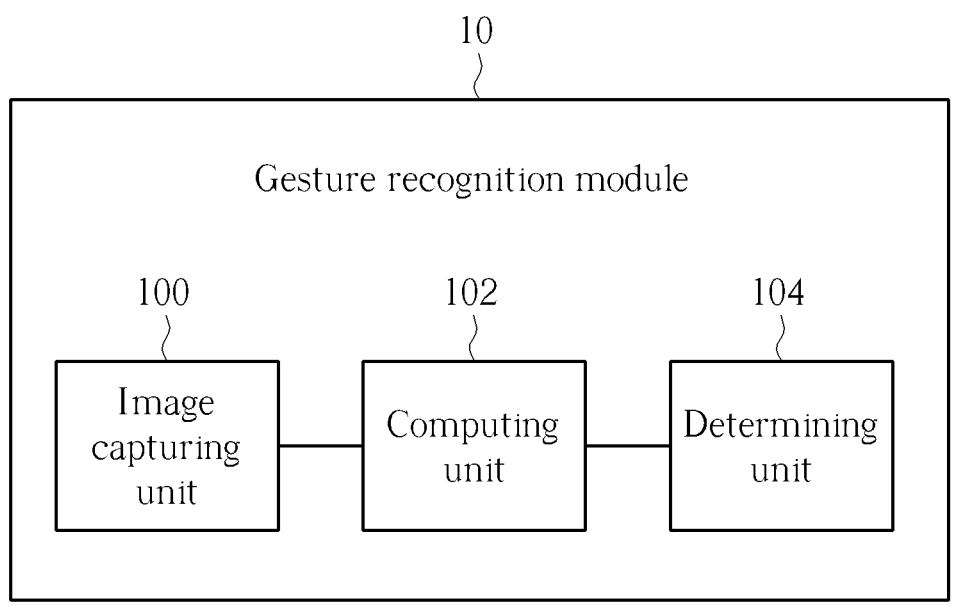
FIG. 1 is a schematic diagram of a gesture recognition module according to an example of the present invention.

Please refer to FIG. 1, which is schematic diagram of a gesture recognition module 10 according to an example of the present invention. The gesture recognition module 10 includes an image capturing unit 100, a computing unit 102 and a determining unit 104. In detail, the image capturing unit 100 captures (or detects) a first pixel value, a second pixel value, a third pixel value and a fourth pixel value sequentially of images of a gesture of a user. The computing unit 102 is coupled to the image capturing unit, and determines a first minimum surrounding shape comprising a first pixel difference between the first pixel value and the second pixel value, and a second minimum surrounding shape comprising a second pixel difference between the third pixel value and the fourth pixel value, wherein shapes of the first minimum surrounding shape and the second minimum surrounding shape are the same or methods for generating the first minimum surrounding shape and the second minimum surrounding shape are the same. The determining unit 104 is coupled to the computing unit, and determines the gesture according to a relation between the first minimum surrounding shape and the second minimum surrounding shape. In short, after the image capturing unit 100 captures the gesture made by the user, the computing unit 102 performs a computation according to pixel values captured, and generates a computed result, such that the determining unit 104 can determine the gesture of the user according to the computed result.

Please note that, the gesture recognition module 10 is simply used for illustrating the present invention. Practically, the image capturing unit 100, the computing unit 102 and the determining unit 104 can be integrated as a single gesture recognition unit (e.g., gesture recognition chip), and is not limited herein. Besides, the gesture recognition module 10 can be coupled to any device such as a mouse, a keyboard, a set-top box, a motion sensing input device, a handheld device (e.g., mobile device), a liquid crystal display (LCD) television (TV), a smart TV, etc. Thus, a predetermined command can be triggered according to a recognition result, and the device can be controlled accordingly. Furthermore, a realization of the image capturing unit 100 is not limited. For example, an image sensor such a charge-coupled device (CCD) or a complementary metal-oxide-semiconductor (CMOS) can be used for realizing the image capturing unit 100.

Figure 2:
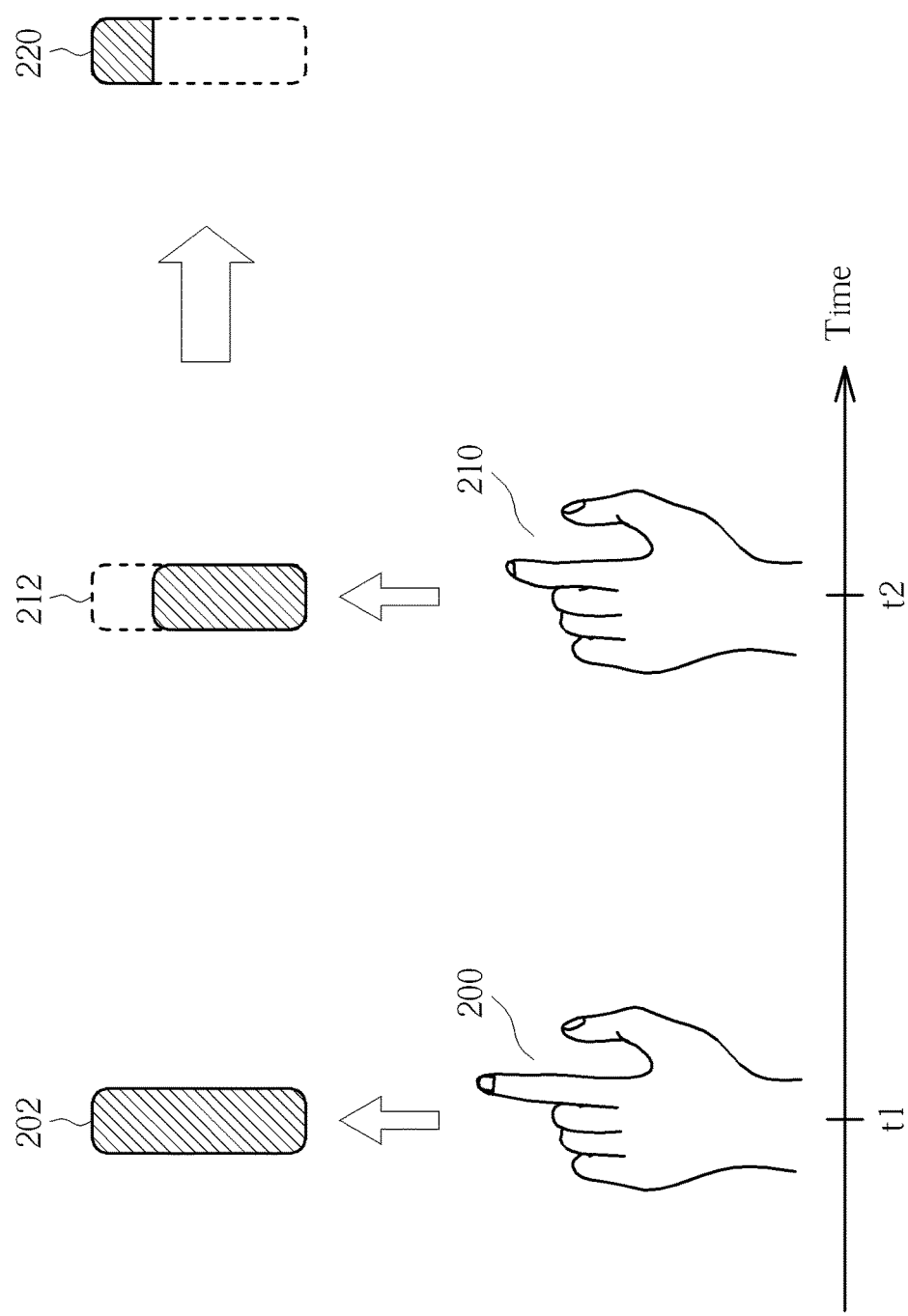
FIG. 2 is a schematic diagram of pixel values of images of a finger according to an example of the present invention.

Please refer to FIG. 2, which is a schematic diagram of pixel values of images of a finger according to an example of the present invention, wherein a straight finger and a curved finger of a user is used for illustrating calculation of pixel differences. As shown in FIG. 2, after the straight finger at a time instant t1 is changed to the curved finger at a time instant t2, the image capturing unit 100 captures a pixel value 202 of a straight gesture 200 at the time instant t1 and a pixel value 212 of a curved gesture 210 at the time instant t2. Thus, the computing unit 102 can obtain (e.g., via a computation) a pixel difference 202 according to the pixel value 202 and the pixel value 212. Please note that, a method according to which the image capturing unit 100 captures and stores the pixel value of the finger is arbitrary, as long as the pixel value can be used for distinguishing difference of the images. For example, the pixel value can be stored according to a gray scale, wherein a range of the pixel value can be 8-bit (i.e., the pixel value is within 0-255), 10-bit (i.e., the pixel value is within 0-1023) or 12-bit (i.e., the pixel value is within 0-4095), and is not limited.

Figure 3:
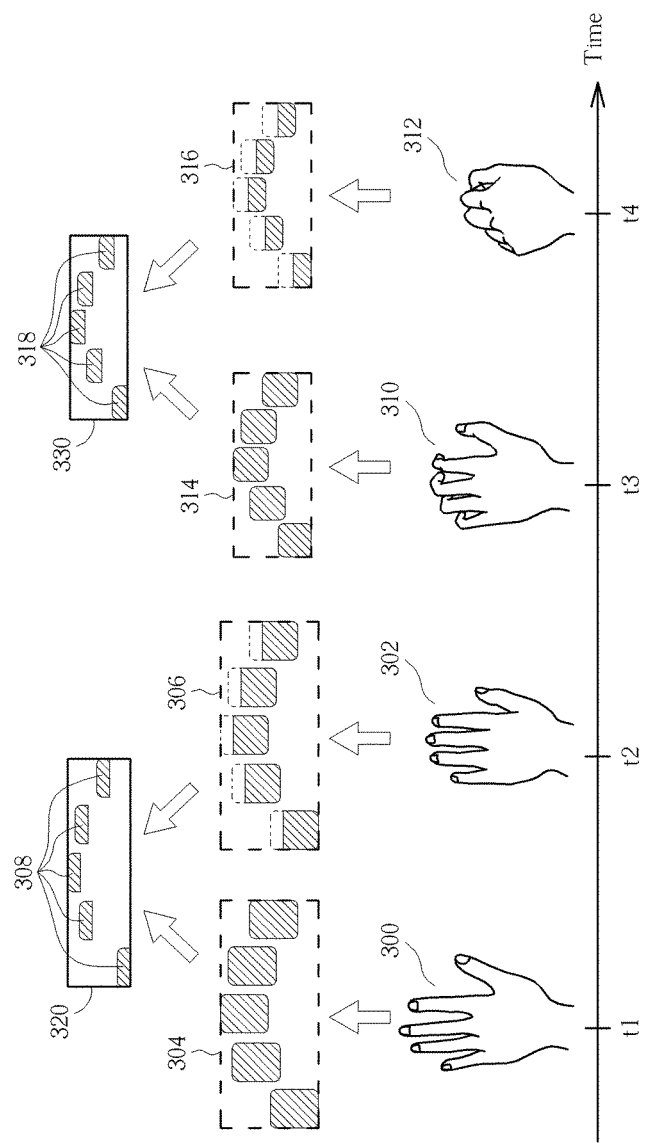
FIG. 3 is a schematic diagram of a pixel difference of images of a gesture according to an example of the present invention.

Please refer to FIG. 3, which is a schematic diagram of a pixel difference of images of a gesture according to an example of the present invention, wherein a grab gesture of a user is used for illustrating spirit of the present invention. As shown in FIG. 3, after a straight (i.e., opened or half-opened) palm is changed to a fisted (or half-fisted) palm gradually during time instants t1-t4, the image capturing unit 100 captures pixels values 304 and 306 of images of gestures 300 and 302 at the time instants t1 and t2, respectively. Thus, the computing unit 102 can obtain (e.g., via a computation) a pixel difference 308 according to the pixel values 304 and 306. Then, the image capturing unit 100 captures pixels values 314 and 316 of images of gestures 310 and 312 at the time instants t3 and t4, respectively. Thus, the computing unit 102 can obtain (e.g., via a computation) a pixel difference 318 according to the pixel values 314 and 316. Further, the computing unit 102 determines a minimum rectangular shape 320 including (i.e., surrounding) the pixel difference 308 and a minimum rectangular shape 330 including (i.e., surrounding) the pixel difference 318. Thus, the determining unit 104 can determine (i.e., recognize) the gesture of the user according to a relation between the minimum rectangular shapes 320 and 330. For example, when an area of the minimum rectangular shape 320 is greater than an area of the minimum rectangular shape 330, the determining unit 104 determines that the gesture of the user is a grab gesture, i.e., determines that the user makes a grab by using the palm during the time instants t1-t4. Alternatively, a threshold can be configured, to avoid that the determining unit 104 may make a wrong decision, when for example, the palm is only shaken slightly without making the grab. For example, the determining unit 104 can determine that the gesture is the grab gesture, when the area of the minimum rectangular shape 320 is greater than a sum of the area of the minimum rectangular shape 330 and a first predetermined value.

Please note that, the abovementioned example is illustrated according to FIG. 3, i.e., the grab gesture is used for describing the spirit of the present invention. When the user makes a release gesture, the image capturing unit 100, the computing unit 102 and the determining unit 104 can also determine (i.e., recognize) the release gesture of the user according to the abovementioned steps. For example, when the area of the minimum rectangular shape 320 is smaller than the area of the minimum rectangular shape 330, the determining unit 104 determines that the gesture of the user is the release gesture, i.e., determines that the user makes a release by using the palm during the time instants t1-t4. Alternatively, the determining unit 104 can determine that the gesture is the release gesture, when the area of the minimum rectangular shape 330 is greater than a sum of the area of the minimum rectangular shape 320 and a second predetermined value, to avoid the wrong decision, wherein the first predetermined value (i.e., the threshold for the grab gesture) and the second predetermined value (i.e., the threshold for the release gesture) can be the same or different. Thus, an accuracy of the gesture recognition is improved with a lower cost according to the present invention, and tradeoff between the cost and the accuracy in the prior art is solved.

Please note that, the user can use the palm to control any device via the gesture recognition module 10. For example, the user can simulate (or trigger) a click selection of a left button of a computer mouse by using the grab gesture, to select an icon or a menu shown on a screen, when the gesture recognition module 10 is connected to the LCD TV or the smart TV. For example, the user can execute or move the icon or the menu after selecting the icon or the menu. Alternatively, the grab gesture can be used for simulating (or triggering) a click of a right button of the computer mouse, to open the menu. Note that, the spirit of the present invention is not limited to the abovementioned examples. A command to which the grab gesture is corresponded (e.g., triggered) can be predetermined and designed according to requirements of the products to which the present invention is applied or requirements of the user. An input device simulated (or triggered) via the present invention is also not limited to the computer mouse mentioned above.

On the other hand, the gesture recognition module 10 captures the images of the gesture of the user sequentially at the 4 time instants as shown in FIG. 3. Practically, the gesture recognition module 10 can also capture the images of the gesture of the user sequentially at the 3 time instants. That is, the time instant t2 and the time instant t3 are the same time instant, i.e., the pixel value 306 and the pixel value 314 are the pixel value of the same image. Besides, a time interval between the time instants (e.g., neighboring time instants) can be configured and stored in the gesture recognition module 10 by a manufacturer of the gesture recognition module 10. Alternatively, the time interval can be configured according to a preference of the user, and is not limited herein.

Figure 4:
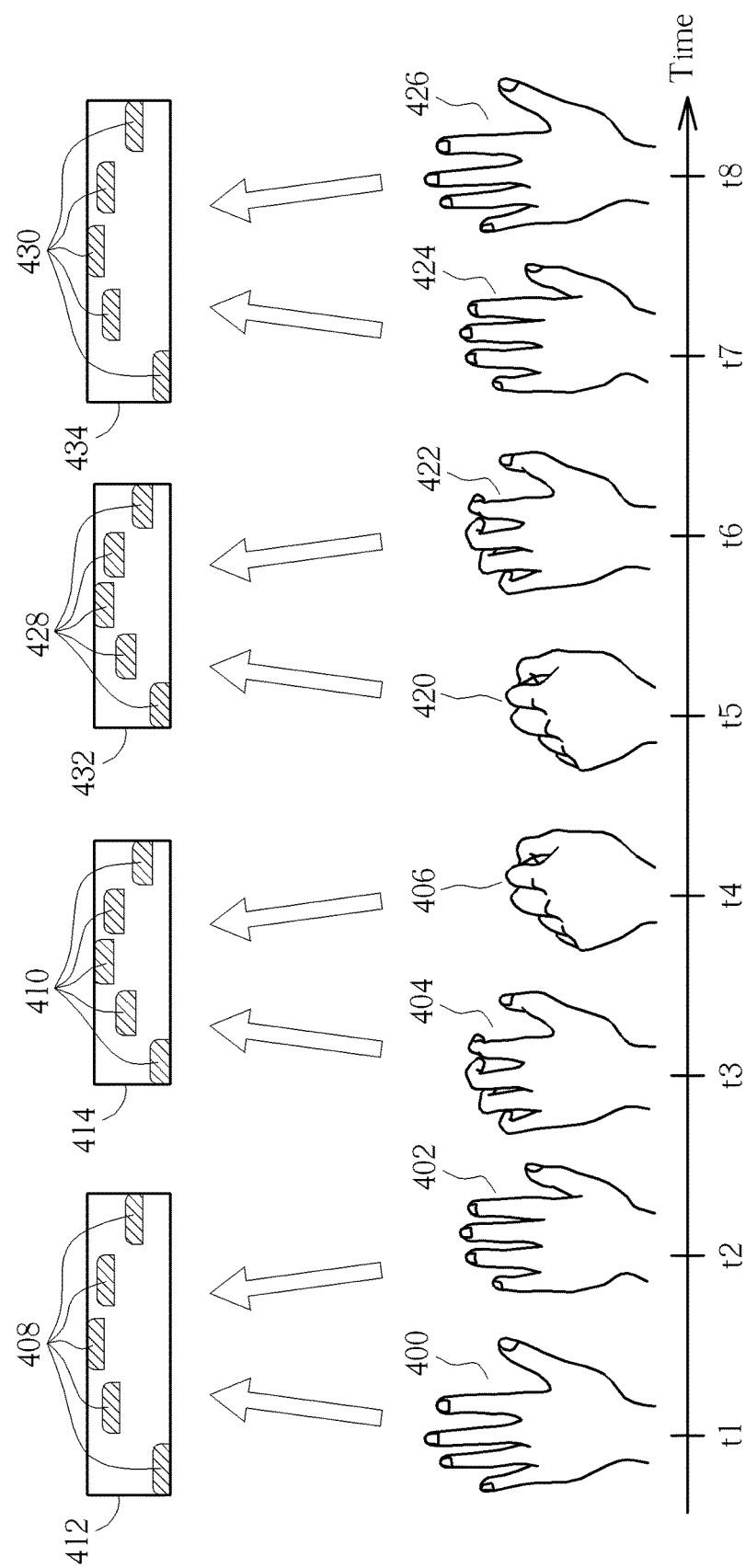
FIG. 4 is a schematic diagram of a pixel difference of images of a gesture according to an example of the present invention.

Besides, after slight modification is made to the gesture recognition module 10, the gesture recognition module 10 can capture the gesture at more time instants sequentially. Please refer to FIG. 4, which is a schematic diagram of pixel differences of images of a gesture according to an example of the present invention, wherein a grab gesture and a release gesture of a user are used for illustrating spirit of the present invention. As shown in FIG. 4, the image capturing unit 100 captures images of gestures 400-406 at time instants t1-t4, respectively, to obtain four pixel values of the images (not shown in the figure), respectively. Thus, the computing unit 102 can obtain (e.g., via a computation) pixel differences 408 and 410 according to the pixel values, and determines a minimum rectangular shape 412 including (i.e., surrounding) the pixel difference 408 and a minimum rectangular shape 414 including (i.e., surrounding) the pixel difference 410. Then, the image capturing unit 100 captures images of gestures 420-426 at time instants t5-t8, respectively, to obtain four pixel values of the images (not shown in the figure), respectively. Thus, the computing unit 102 can obtain (e.g., via a computation) pixel differences 428 and 430 according to the pixel values, and determines a minimum rectangular shape 432 including (i.e., surrounding) the pixel difference 428 and a minimum rectangular shape 434 including (i.e., surrounding) the pixel difference 430. Since an area of the minimum rectangular shape 412 is greater than an area of the minimum rectangular shape 414, and an area of the minimum rectangular shape 432 is smaller than an area of the minimum rectangular shape 434, the determining unit 104 can determine (i.e., recognize) that the user makes a grab and a release by using the palm during the time instants t1-t8, sequentially. Similar to the example mentioned previously, the time instant t2 and the time instant t3 can be the same time instant, i.e., the second pixel value and the third pixel value are the pixel value of the same image, and the time instant t6 and the time instant t7 can be the same time instant, i.e., the sixth pixel value and the seventh pixel value are the pixel value of the same image.

According to the above example, the user can simulate (or trigger) a click selection of a left button of a computer mouse by using a combination of the grab gesture and the release gesture, to select an icon or a menu shown on a screen, when the gesture recognition module 10 is connected to the LCD TV or the smart TV. For example, the user can execute or move the icon or the menu after selecting the icon or the menu. Alternatively, the combination of the grab gesture and the release gesture can be used for simulating (or triggering) a click of a right button of the computer mouse, to open the menu. Note that, the spirit of the present invention is not limited the abovementioned examples. A command to which the combination of the grab gesture and the release gesture is corresponded (e.g., triggered) can be predetermined and designed according to requirements of the products to which the present invention is applied or requirements of the user. An input device simulated (or triggered) via the present invention is also not limited to the computer mouse mentioned above.

Besides, the gesture recognition module 10 determines the grab gesture and the release gesture by using 4 pixel differences in FIG. 4. Practically, the gesture recognition module 10 can also determine the grab gesture and the release gesture by using 3 pixel differences, i.e., the pixel differences obtained within the time instants t1-t4 and t7-t8. Further, those skilled in the art can readily make modifications or alterations according to system requirements. For example, pixel values of gestures captured at various number time instants can be used for determine a gesture, or any combination (or trend) of gestures can be used for triggering a command, to control a device, and is not limited herein.

Figure 5:
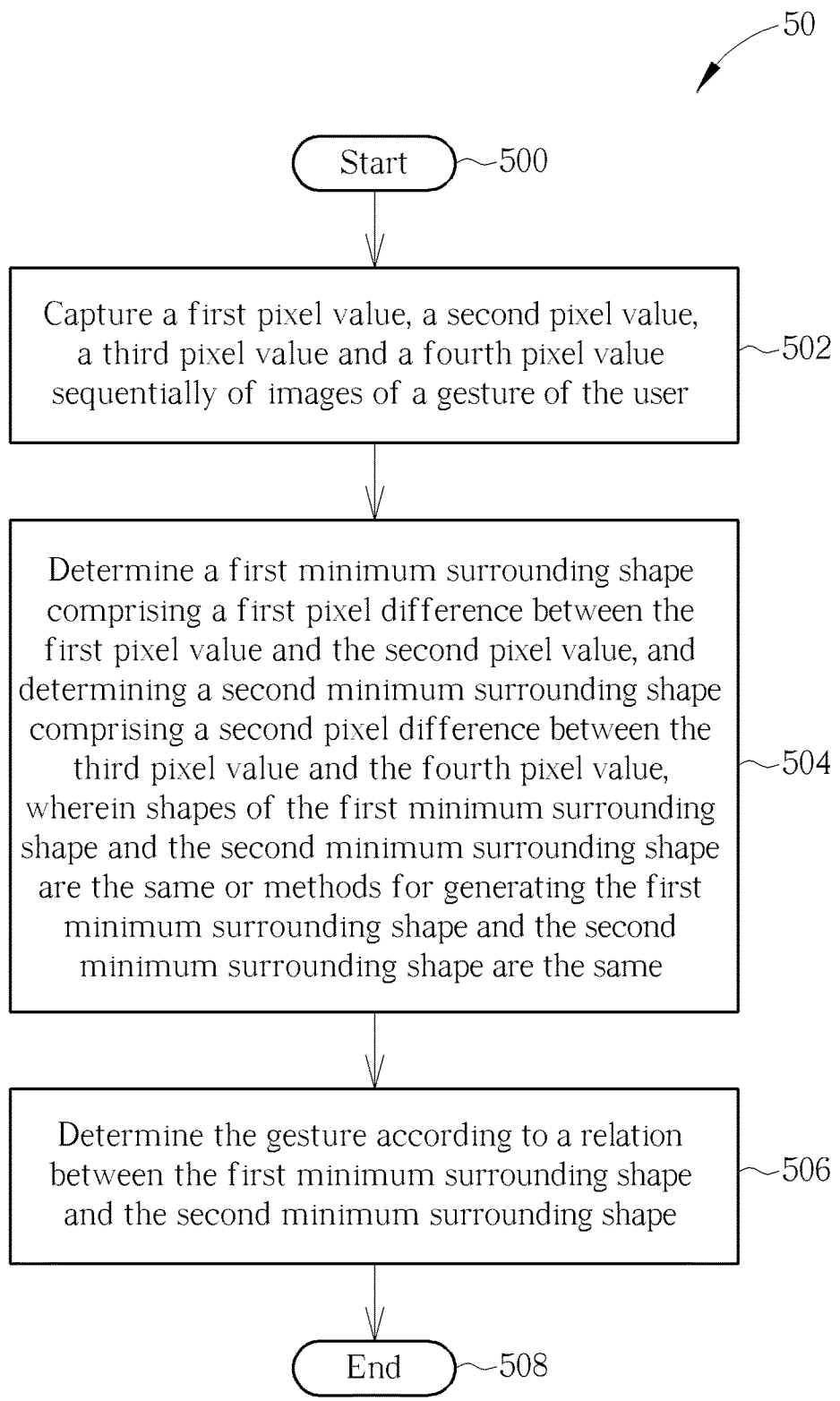
FIG. 5 is a flowchart of a process according to an example of the present invention.

According to the above description, operations of the gesture recognition module 10 in FIG. 1 can be summarized into a process 50 as shown in FIG. 5. The process 50 includes the following steps:

Step 500: Start.

Step 502: Capture a first pixel value, a second pixel value, a third pixel value and a fourth pixel value sequentially of images of a gesture of the user.

Step 504: Determine a first minimum surrounding shape comprising a first pixel difference between the first pixel value and the second pixel value, and determining a second minimum surrounding shape comprising a second pixel difference between the third pixel value and the fourth pixel value, wherein shapes of the first minimum surrounding shape and the second minimum surrounding shape are the same or methods for generating the first minimum surrounding shape and the second minimum surrounding shape are the same.

Step 506: Determine the gesture according to a relation between the first minimum surrounding shape and the second minimum surrounding shape.

Step 508: End.

Operations and variations of the process 50 can be referred to the above illustration, and are not narrated herein.

Figure 6:
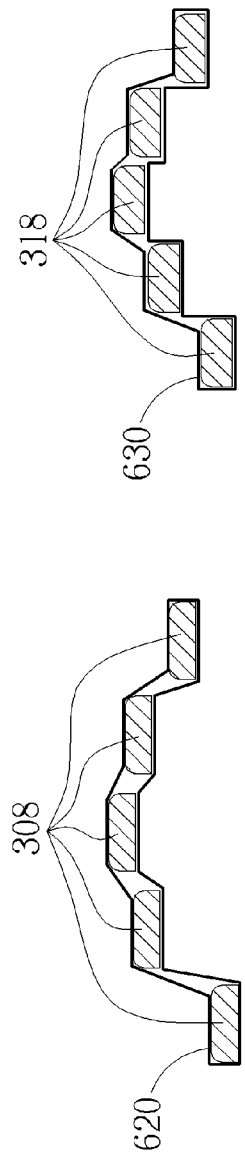
FIG. 6 is a schematic diagram of a minimum surrounding shape of the pixel difference in FIG. 3 according to an example of the present invention.

It is worth noting that the rectangular shape is used in the abovementioned examples for surrounding the pixel differences. However, those who skilled in the art can readily make modifications and alterations by using a geometric shape such as an ellipse shape or a polygon shape, or an irregular shape generated by using an image lasso technique. Notably, shapes of the minimum surrounding shapes are not limited. As long as the minimum surrounding shapes surround the corresponding pixel differences, the requirement of the present invention is satisfied. For example, please refer to FIG. 6, which is a schematic diagram of minimum surrounding shapes 620 and 630 of the pixel differences 308 and 318, respectively, according to an example of the present invention. The minimum surrounding shapes 620 and 630, surrounding the pixel differences 308 and 318, are generated by an image lasso technique. The image lasso technique, a technique of determining a specific area of object(s) in an image, is known by those who skilled in the art, which not narrated herein. Shapes of the minimum surrounding shapes 620 and 630 generated by the image lasso technique are usually irregular, i.e., the minimum surrounding shapes 620 and 630 are not able to be described by any nominal geometric shape. Preferably, the same shape should be used for surrounding the pixel differences, to fairly compare areas of the shapes surrounding the pixel differences.

To sum up, the present invention provides a gesture recognition module and a gesture recognition method with a low complexity and a high accuracy. Thus, tradeoff between the cost and the accuracy in the prior art is solved.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A gesture recognition module for recognizing a gesture performed by a specific quantity of fingers of a hand of a user, the gesture recognition module comprising:
an image capturing unit, for sequentially capturing a first pixel group comprising the specific quantity of first pixel values, a second pixel group comprising the specific quantity of second pixel values, a third pixel group comprising third pixel values and a fourth pixel group comprising fourth pixel values at different time instants when the hand performs a first gesture, wherein each pixel value of the first, second, third and fourth pixel values corresponds to one image of each finger;
a computing unit, coupled to the image capturing unit, for obtaining a first difference group comprising the specific quantity of first pixel differences between the first pixel values and the second pixel values and a second difference group comprising the specific quantity of second pixel differences between the third pixel values and the fourth pixel values, and determining a first minimum surrounding shape and a second minimum surrounding shape, wherein the first minimum surrounding shape forms as a first shape surrounding all the first pixel differences in a minimum manner, the second minimum surrounding shape forms as a second shape surrounding all the second pixel difference in a minimum manner, and the first shape and the second shape are the same type of shape or methods for generating the first minimum surrounding shape and the second minimum surrounding shape are the same; and
a determining unit, coupled to the computing unit, for determining the first gesture according to an area relation between the first minimum surrounding shape and the second minimum surrounding shape.

2. The gesture recognition module of claim 1, wherein the determining unit determines that the first gesture is a grab gesture when an area of the first minimum surrounding shape is greater than an area of the second minimum surrounding shape, and the determining unit determines that the first gesture is a release gesture when the area of the first minimum surrounding shape is smaller than the area of the second minimum surrounding shape.

3. The gesture recognition module of claim 2, wherein the determining unit determines that the first gesture is the grab gesture when the area of the first minimum surrounding shape is greater than a sum of the area of the second minimum surrounding shape and a first predetermined value, and the determining unit determines that the first gesture is the release gesture when the area of the second minimum surrounding shape is greater than a sum of the area of the first minimum surrounding shape and a second predetermined value.

4. The gesture recognition module of claim 2, wherein a click selection of a computer input device or an action opening a menu is simulated, when the first gesture is the grab gesture.

5. The gesture recognition module of claim 2, further executing the following steps:
the image capturing unit capturing a fifth pixel value, a sixth pixel value, a seventh pixel value and a eighth pixel value sequentially of images of a second gesture of the user, after capturing the fourth pixel value;
the computing unit determining a third minimum surrounding shape comprising a third pixel difference between the fifth pixel value and the sixth pixel value, and determining a fourth minimum surrounding shape comprising a fourth pixel difference between the seventh pixel value and the eighth pixel value, wherein shapes of the third minimum surrounding shape and the fourth minimum surrounding shape are the same or methods for generating the third minimum surrounding shape and the fourth minimum surrounding shape are the same; and
the determining unit determining the second gesture according to a relation between the third minimum surrounding shape and the fourth minimum surrounding shape.

6. The gesture recognition module of claim 5, wherein the determining unit determines that the second gesture is the grab gesture when an area of the third minimum surrounding shape is greater than an area of the fourth minimum surrounding shape, and the determining unit determines that the second gesture is the release gesture when the area of the third minimum surrounding shape is smaller than the area of the fourth minimum surrounding shape.

7. The gesture recognition module of claim 6, wherein a click of a computer input device or an action opening a menu is simulated, when the first gesture is the grab gesture and the second gesture is the release gesture.

8. The gesture recognition module of claim 1, wherein the third pixel value and the second pixel value are the same, and are a pixel value of a same image.

9. The gesture recognition module of claim 1, wherein the first shape and the second shape are geometric shapes.

10. The gesture recognition module of claim 9, wherein the geometric shapes are rectangular shapes.

11. The gesture recognition module of claim 1, wherein the first minimum surrounding shape and the second minimum surrounding shape are irregular shapes generated by using a lasso technique.

12. A method of recognizing a gesture performed by a specific quantity of fingers of a hand of a user, the method being utilized in a gesture recognition module and comprising:
sequentially capturing a first pixel group comprising the specific quantity of first pixel values, a second pixel group comprising the specific quantity of second pixel values, a third pixel group comprising third pixel values and a fourth pixel group comprising fourth pixel values at different time instants when the hand performs a first gesture, wherein each pixel value of the first, second, third and fourth pixels values corresponds to one image of each finger;
obtaining a first difference group comprising the specific quantity of first pixel differences between the first pixel values and the second pixel values, and obtaining a second difference group comprising the specific quantity of second pixel differences between the third pixel values and the fourth pixel values;
determining a first minimum surrounding shape and a second minimum surrounding shape, wherein the first minimum surrounding shape forms as a first shape surrounding all the first pixel differences in a minimum manner, the second minimum surrounding shape forms as a second shape surrounding all the second pixel difference in a minimum manner, and the first shape and the second shape are the same type of shape or methods for generating the first minimum surrounding shape and the second minimum surrounding shape are the same; and determining the first gesture according to an area relation between the first minimum surrounding shape and the second minimum surrounding shape.

13. The method of claim 12, wherein the first gesture is determined as a grab gesture when an area of the first minimum surrounding shape is greater than an area of the second minimum surrounding shape, and the first gesture is determined as a release gesture when the area of the first minimum surrounding shape is smaller than the area of the second minimum surrounding shape.

14. The method of claim 13, wherein the first gesture is determined as the grab gesture when the area of the first minimum surrounding shape is greater than a sum of the area of the second minimum surrounding shape and a first predetermined value, and the first gesture is determined as the release gesture when the area of the second minimum surrounding shape is greater than a sum of the area of the first minimum surrounding shape and a second predetermined value.

15. The method of claim 13, wherein a click selection of a computer input device or an action opening a menu is simulated, when the first gesture is the grab gesture.

16. The method of claim 13, further comprising:

capturing a fifth pixel value, a sixth pixel value, a seventh pixel value and a eighth pixel value sequentially of images of a second gesture of the user, after capturing the fourth pixel value;

determining a third minimum surrounding shape comprising a third pixel difference between the fifth pixel value and the sixth pixel value, and determining a fourth minimum surrounding shape comprising a fourth pixel difference between the seventh pixel value and the eighth pixel value, wherein shapes of the third minimum surrounding shape and the fourth minimum surrounding shape are the same or methods for generating the third minimum surrounding shape and the fourth minimum surrounding shape are the same; and determining the second gesture according to a relation between the third minimum surrounding shape and the fourth minimum surrounding shape.

17. The method of claim 16, wherein the second gesture is determined as the grab gesture when an area of the third minimum surrounding shape is greater than an area of the fourth minimum surrounding shape, and the second gesture is determined as the release gesture when the area of the third minimum surrounding shape is smaller than the area of the fourth minimum surrounding shape.

18. The method of claim 17, wherein a click of a computer input device or an action opening a menu is simulated, when the first gesture is the grab gesture and the second gesture is the release gesture.

19. The method of claim 12, wherein the third pixel value and the second pixel value are the same, and are a pixel value of a same image.

20. The method of claim 12, wherein the first shape and the second shape are geometric shapes.

21. The method of claim 20, wherein the geometric shapes are rectangular shapes.

22. The method of claim 12, wherein the first minimum surrounding shape and the second minimum surrounding shape are irregular shapes generated by using a lasso technique.

* * * * *